Jan. 10, 1956 P. T. KRAMPE ET AL Re. 24,107
PORTABLE STEAM CLEANERS
Original Filed June 8, 1951
Fig. 1.
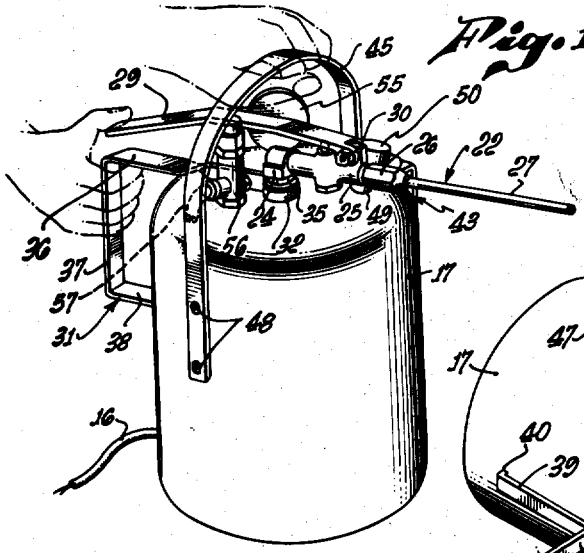
Fig. 2.
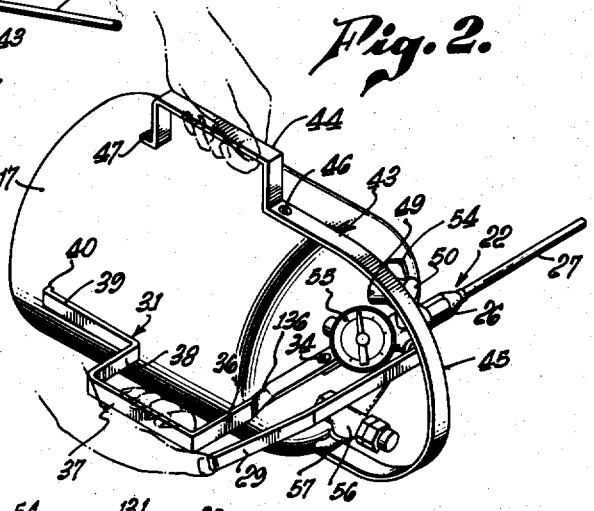
Fig. 3.
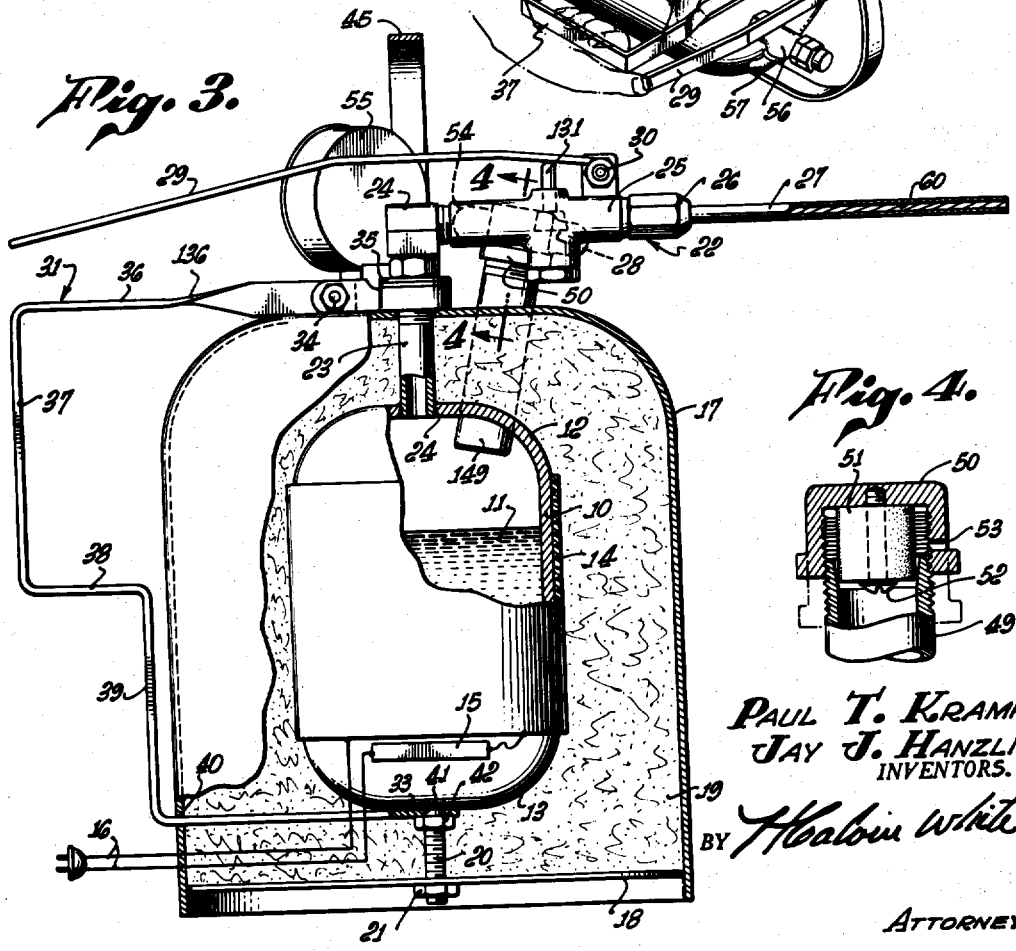
Fig. 4.
PAUL T. KRAMPE,
JAY J. HANZLIK,
INVENTORS.
BY H. Albin White
ATTORNEY.

United States Patent Office

Re. 24,107
Reissued Jan. 10, 1956

24,107

PORTABLE STEAM CLEANERS

Paul T. Krampe, Glendale, and Jay J. Hanzlik, North Hollywood, Calif.; said Hanzlik assignor to said Krampe Original No. 2,639,365, dated May 19, 1953, Serial No. 230,458, June 8, 1951. Application for reissue January 18, 1955, Serial No. 482,690

10 Claims. (Cl. 219—38)

Matter enclosed in heavy brackets [ ] appears in the original patent but forms no part of this reissue specification; matter printed in italics indicates the additions made by reissue.

This invention relates to improved portable steam cleaning devices of a type adapted to discharge a jet of high velocity steam for cleaning any of various types of equipment, as for instance that used by restaurants in the preparation of food, *by butcher shops in the cleaning of tables, chopping blocks and other equipment, by garages and other repair establishments in the cleaning of heavily incrusted and impacted grease on automotive parts, etc.*

Devices of the present invention include a small portable boiler, a heating element for converting water in the boiler to steam, and a valve controlled nozzle fitting for discharging the steam as a jet onto a unit of equipment to be cleaned. An important object of the invention is to provide a portable steam cleaning device of this type especially constructed for maximum facility of manipulation to give an operator as complete control over the steam jet as possible. Specifically, the device is so designed that an operator may effectively control the starting and stopping of the steam discharge, its intensity, and its direction. Further, the present devices are so constructed as to enable the operator at will to very easily change the position of the device in a manner causing the discharge of a certain amount of water or cleaning solution with the steam.

The above facility of control is attained in large part, *in the particular device chosen for illustration,* by the provision of an improved handle arrangement for supporting and manipulating the device. Specifically, we employ a plurality of handles to be gripped separately by the two hands of an operator and so relatively positioned as to maximize the control afforded the operator. One of these handles may project rearwardly from the boiler to be held in the first hand of an operator, while a second handle projects laterally from a side of the boiler for engagement by the operator's second hand. These two [rear and side] handles together enable the operator to tilt or roll the boiler over onto its side in a manner introducing a controlled amount of water into the upper steam outlet for discharge with the steam onto the work. Another handle desirably projects upwardly above the boiler to be held by the operator's second hand when the boiler is to be used in an upright condition.

Preferably, each of the three handles comprises a generally U-shaped loop fastened at its opposite ends to the boiler. To attain maximum facility in handling the device, the side and top handles should lie in a common plane extending perpendicular to the plane of the rear handle. The side and top handles may be formed of a single elongated strip of metal deformed to form a laterally projecting loop and then extending upwardly and diametrically over the top of the boiler to form an upwardly projecting top loop.

A further feature of the invention resides in the provision of an actuating element for controlling the steam discharge valve and positioned adjacent one of the boiler handles for actuation by a hand gripping that handle. Preferably, the valve actuating element extends rearwardly to a location over the rear boiler handle for actuation by the thumb of a hand gripping that handle.

Certain particular features of the invention have to do with preferred means for mounting the rear handle to the boiler in a manner assuring positive support of the boiler by the handle, and at the same time simplifying the structure of the device. As will appear, this handle may be fastened at its upper and lower ends respectively to central portions of the top and bottom walls of the boiler. The upper end of the handle may be very simply but effectively connected to the boiler by attachment to the upper steam discharge fitting on the boiler, the attachment to this fitting preferably being made at the outside of an outer shell extending about and insulated from the boiler. The lower end of the rear handle may be connected to the boiler at the inside of the outer shell and insulation, preferably by means of a fastening element which also serves the purpose of retaining a bottom wall of the shell in position.

*An important feature of the invention, regardless of the type of provision made, by handles or otherwise, to enable tilting or rolling of the boiler, so as to produce a discharge of wet steam as desired, resides in the special combination with the boiler of boiler heating means adapted to effect the most rapid and efficient generation of steam possible in a unit of the tiltable sort here involved. To this end, the boiler is of cylindrical cross section, its axis being vertically upright in the normal use of the same in discharging dry steam, and the heating element is in the form of a conformed cylindrical, blanket-like electrical heating coil wrapped about the boiler in direct heat conducting contact therewith.*

*The outer surface of this heating coil is exposed outwardly in contact with insulating material filling the space between the boiler and outer shell, and the electrical leads for the heating element are taken out through this insulation and shell. There thus results a fully insulated unit of portable character which is continuously usable at full efficiency, after a minimum heat-up period, whether it is operated in a normal upright position or at an angle, sideward, forward or backward.*

The above and other features and objects of the present invention will be better understood from the following detailed description of the typical embodiment illustrated in the accompanying drawing, in which:

Fig. 1 is a perspective view of a steam cleaner embodying the invention [, as held] in an upright condition [by means of the rear and top handles];

Fig. 2 is a perspective view of the cleaner [as held by the rear and side handles,] with the boiler rolled over onto its side to discharge a certain amount of water with the steam;

Fig. 3 is an enlarged side view partly in section, showing the inner construction of the cleaner; and Fig. 4 is an enlarged fragmentary section through the boiler filling spout, taken on line 4—4 of Fig. 3.

Referring first to Fig. 3, the illustrated steam cleaner includes a boiler 10 within which is contained a body 11 of water or steam cleaning solution. The boiler is typically essentially cylindrical as shown, and may have somewhat rounded upper and lower end walls 12 and 13. An electric heating element 14 *of blanket-like outline, comprised of an electrically insulated coil,* extends about the cylindrical side wall of the boiler for heating the contained solution to produce steam. A thermostat 15 is fastened to the underside of the boiler and controls the temperature to which the solution or water is heated by element 14. Thermostat 15 and the heating element are connected in series to power supply cord 16, which is connectable to a suitable power source. Preferably, the heating element is designed to operate on the usual 110 volt A. C. commercial power.

The boiler is contained within and spaced from an upstanding cylindrical outer shell 17, having a separately formed circular bottom wall 18. A mass of heat insulating material 19 is contained in the shell about the boiler for preventing the transmission of the high boiler temperatures *from the boiler and otherwise exposed heating element 14* to the shell. At the center of its bottom wall, the boiler carries a threaded elongated stud 20, which projects downwardly through the insulating material and bottom wall 18 of the shell, and carries a lower nut 21 by which wall 18 is held in place.

Steam is discharged from the boiler through a tubular upper discharge fitting assembly generally indicated at 22. This assembly includes a tube or pipe 23 threaded into a central steam discharge opening 24 in the boiler top wall and projecting upwardly through the insulation and shell 17 to a location at the outside of the shell. At its upper end, tube 23 carries an angle fitting or elbow 24, which in turn carries a forwardly projecting valve body 25. Nozzle 26 is threaded onto the forward end of valve body 25 *for removal and replacement, if desired,* and has an elongated relatively small diameter forwardly projecting discharge barrel portion 27 from which the steam is emitted. The nozzle is preferably internally rifled at 60 to impart a spiral motion to the discharged steam.

The steam discharge is controlled by actuation of a valve element 28 movably mounted in valve body 25. The valve element is opened by depression of an elongated actuating element 29 pivotally connected at its forward end 30 to the valve body and extending rearwardly over upwardly projecting stem 131 of the valve element and beyond that stem to a location at the rear of the shell.

The various handles for the device are preferably formed of elongated flat strips or bars of metal formed as shown to provide rear, side, and top handle loops. Referring especially to Fig. 3, the rear handle 31 comprises such a metal bar forming a rearwardly projecting handle loop and connected at its upper and lower ends 32 and 33 to the steam discharge fitting assembly 22 and the underside of the boiler respectively. More particularly, the upper end 32 of the rear handle is wrapped about pipe 23, with the greater transverse dimension of the handle strip extending vertically, and after being wrapped about the pipe is connected to itself by screw 34 in a manner tightly fastening the handle to the discharge assembly. The portion of handle 31 extending about pipe 23 is retained against relative upward displacement by engagement with the underside of an annular washer 35 which bears against the underside of elbow 24.

From its point of connection to the discharge fitting assembly, handle 31 extends first rearwardly at 36 beneath valve actuating element 29, then downwardly at 37, inwardly at 38, downwardly along the rear side of shell 17 at 39, and inwardly through opening 40 in the shell and through insulation 19 to the underside of the boiler. The upper rearwardly extending portion 36 of the rear handle may be twisted through 90 degrees at a point 136 intermediate its ends, and extends rearwardly approximately the same distance as the valve actuating element 29. The lower end 33 of the rear handle contains an opening 41 through which stud 20 passes, and this lower end portion of the handle is then tightened against the underside of the boiler by a nut 42 carried by the stud.

A second metal strip or bar 43 is mounted to the outside of shell 17 and deformed in a manner forming side and top handles for the device. Specifically, this strip 43 forms a laterally projecting vertically extending loop 44 at the left side of shell 17, and then curves upwardly and diametrically over the top of the shell to form an upper handle loop 45. Strip 43 is fastened to the shell by screws or other fasteners 46 and 47 above and beneath side loop 44, and by fasteners 48 at the opposite side of the shell.

The cleaning solution or water is filled into boiler 10 through an upper filling tube 49 (see Fig. 4). The lower end 149 of this filling tube projects downwardly a short distance into the boiler, to prevent complete filling of the boiler with liquid, and thus assure the maintenance of a certain amount of gas in the upper portion of the boiler. Filling tube 49 is closed during operation of the device by a cap 50 threaded onto its upper end. At its inside cap 50 carries a cylindrical rubber seal element or plug 51 fastened to the cap by screw 52, and engageable in sealing relation with the inner surface of neck 49 when the cap is in its closed condition. Element 51 thus forms a positive seal preventing the escape of steam through the filling neck.

At a location near but spaced above the lower edge of the cap, the side wall of the cap contains an opening 53, which is closed by the wall of the filling tube in the closed broken-line position of the cap. Should the cap be loosened either intentionally or unintentionally while the boiler is under pressure, a certain amount of steam is emitted through opening 53 when the cap reaches the full line position of Fig. 4, to warn the operator against further removal of the cap. The cap may have wing portions 54 projecting from its opposite sides to facilitate its application to and removal from the filling neck.

At its upper side, the device carries a pressure gauge 55, connected into the top of the boiler to indicate the steam pressure in the boiler. Also a safety release valve 56 is connected into the top of the boiler to discharge a portion of the steam in the boiler if the pressure reaches too great a value. Safety valve 56 preferably carries a discharge tube 57 adapted to direct released steam downwardly and to the right and thus away from the operator.

In order to place the steam cleaner in operation, the water or cleaning solution 11 is filled into boiler 10 through neck 49, cap 50 is then applied to the filling neck and cord 16 plugged into an electric power source. This energizes heater element 14 to heat the boiler and produce steam. Thermostat 15 controls the energization of heater element 14 in a manner maintaining the boiler at a predetermined proper temperature. Preferably, the steam pressure, as indicated by gauge 55, is maintained between about 50 lbs. per square inch and 90 lbs. per square inch. Safety valve 56 may be set to release at approximately 100 lbs. per square inch.

The operator [grips] *may transport the unit by gripping* rear handle 31 with his right hand, and [grips] either side loop 44 or top loop 45 with his left hand (see Figs. 1 and 2). The steam discharge is *then* controlled by the thumb of the right hand, which may actuate valve control element 29 without removal of the hand from rear handle 31. When the left hand holds the upper loop 45, the boiler is maintained in the upright position of Fig. 1, in which the generated steam in the upper portion of the boiler passes upwardly into the discharge assembly without carrying with it any of the liquid 11. If the steam thus discharged becomes too dry, the operator may grip side handle 44 with his left hand and then roll or tilt the device onto its side (see Fig. 2) so that a certain amount of the unvaporized liquid is discharged with the steam.

*Other modes of mounting the boiler for the tilting manipulations described above may be availed of, especially in sizes or capacities of the unit greater than that illustrated, in which the factor of weight makes manual lifting impractical. In any such adaptation like benefits are conferred by the special arrangement of boiler, boiler heating and boiler valving provisions herein described in reference to an illustrative embodiment.*

We claim:

1. A portable steam cleaner comprising a boiler for containing a supply of water, a heating element carried by the boiler for converting said water to steam, a discharge nozzle carried by the boiler in communication with an upper portion thereof and acting to discharge steam in a forward direction from the boiler, valve means for controlling the discharge of steam from said nozzle, a handle projecting from said boiler to be gripped by an operator's hand for supporting the boiler, and a rearwardly extending manually depressible operating lever means for said valve means terminating superjacent and operable by the hand gripping said handle.

2. A portable steam cleaner comprising an upstanding essentially cylindrical boiler for holding a supply of water, an electric heater element about said boiler, heat insulating material about said boiler and heating element, an outer shell about said insulating material and having a separately formed bottom wall, a tubular steam discharge fitting projecting from the center of the boiler top first upwardly through said insulating material and shell and then forwardly, a valve in said fitting for controlling the steam discharge therethrough, a generally U-shaped vertically extending loop handle projecting rearwardly from the boiler and having an upper end fastened about said upwardly extending portion of the discharge fitting above said shell, an elongated actuating member for operating said valve pivotally attached to said forwardly projecting portion of the discharge fitting and extending rearwardly to a location above and near said handle, an elongated element projecting downwardly from a central portion of the boiler bottom through the insulation and fastened at its lower end to the shell bottom, said handle having a lower end portion extending through said shell and insulation to a location adjacent the underside of the boiler, and means fastening said lower portion of the handle to said elongated element at the inside of the insulation and shell.

3. A portable steam cleaner comprising an upstanding essentially cylindrical boiler for holding a supply of water, an electric heater element about said boiler, heat insulating material about said boiler and heating element, an outer shell about said insulating material and having a separately formed bottom wall, a tubular steam discharge fitting projecting from the center of the boiler top first upwardly through said insulating material and shell and then forwardly, a valve in said fitting for controlling the steam discharge therethrough, a generally U- shaped vertically extending loop handle projecting rearwardly from the boiler and having an upper end fastened about said upwardly extending portion of the discharge fitting above said shell, an elongated actuating member for operating said valve pivotally attached to said forwardly projecting portion of the discharge fitting and extending rearwardly to a location above and near said handle, an elongated element projecting downwardly from a central portion of the boiler bottom through the insulation and fastened at its lower end to the shell bottom, said handle having a lower portion extending through said shell and insulation to a location adjacent the underside of the boiler, means fastening said lower portion of the handle to said elongated element at the inside of the insulation and shell, an elongated strip of metal deformed to form a vertically extending generally U-shaped loop handle projecting laterally from said boiler and then curving upwardly and diametrically over the top of the boiler to form an upper handle loop, and means attaching said strip to said casing at opposite ends of each of said lateral and upper handle loops, said rear handle loop extending in a first vertical plane, and said lateral and upper handle loops extending in a vertical plane substantially perpendicular to said first plane.

4. A portable steam cleaner comprising an inner metal boiler for containing a supply of water, an outer sheet metal shell enclosing said boiler in spaced relation thereto, conduit means communicating between the boiler and the outside of said shell, valve means interconnected with said conduit means at the outer end of the shell for manual control of any fluid flow through said conduit means, means on the inner boiler cooperative with said conduit means for releasably securing said boiler within said shell whereby to retain said spaced relationship, insulating means filling the interspace between said boiler and said shell, said boiler having a cylindrical side wall and hemispherical top and bottom walls, respectively, and a cylindrical heating element having an inner surface complementary to the outer cylindrical surface of the boiler side wall disposed therearound in intimate heat transferring engagement with said side wall.

5. A portable steam cleaner as defined in claim 4, including a releasable bottom wall of disk-shape for said shell, releasable means secured to the bottom of the boiler and engageable with said bottom wall for retaining said bottom wall in place.

6. A portable steam cleaner as defined in claim 5, including handle means secured to said last named means and said conduit means and extending releasably laterally through the shell adjacent the bottom thereof, and laterally from said conduit means and downwardly on one side of the shell therebetween, said handle providing a handhold laterally adjacent said conduit means, said valve means including a finger controlled lever extending to a position of operative adjacency to said last mentioned handhold.

7. A portable steam cleaner as defined in claim 4, including a filling tube extending through said shell and boiler and depending into the boiler for a predetermined distance, a cap having a threaded connection with the upper end of said filling tube, a cylindrical rubber seal element disposed within said cap having its lateral edges spaced from the sides of said cap, said seal element being engageable in sealing relationship with the inner surface of the filling tube when the cap is in a closed position thereon, a side wall of the cap having an opening spaced above the lower end of said sealing element adapted to be closed when the cap is threaded upon the tube by engagement of said sealing element with the inside wall of the tube below said opening.

*8. In a steam cleaner construction, a bodily movable hollow metal boiler of cylindrical cross section normally disposed with its axis in upright position, a cylindrical electrical heating element of blanket-like character coaxially surrounding said boiler, said element having its inner surface in heat transmissive contact with said boiler and having an outer cylindrical heat radiating surface, insulating material surrounding said heating element and acting to prevent outward transmission of boiler heat, liquid supply means to said boiler, steam discharge means extending from the interior of said boiler, and a manually actuable valve controlling said discharge means, said construction adapted for tilting manipulation to discharge variable mixtures of steam and liquid therefrom.*

*9. In a steam cleaner construction, a bodily movable hollow metal boiler of cylindrical cross section normally disposed with its axis in upright position, an external shell spaced radially from and housing said boiler, a cylindrical electrical heating element of blanket-like character coaxially surrounding said boiler with its inner cylindrical surface in heat transmissive contact with the boiler and with its outer cylindrical heat radiating surface facing said shell, insulating material in the annular space between said heating element and shell acting to prevent transmission of boiler heat to said shell, liquid supply means for said boiler, steam discharge means coaxial with said boiler extending from the interior thereof to the exterior of said shell, and a manually actuable valve controlling said discharge means on the exterior of said shell, said construction adapted for tilting manipulation to discharge variable mixtures of steam and liquid therefrom.*

*10. In a steam cleaner construction, a bodily movable hollow metal boiler of cylindrical cross section normally disposed with its axis in upright position, an external shell spaced radially from and housing said boiler, a cylindrical electrical heating element of blanket-like character coaxially surrounding said boiler with its inner surface in heat transmissive contact with the boiler and with an outer cylindrical heat radiating surface facing said shell, insulating material in the annular space between said heating element and shell acting to prevent transmission of boiler heat to said shell, liquid supply means for said boiler, steam discharge means extending from the interior of said boiler to the exterior of said shell, mounting means secured to said shell and enabling tilting of the boiler transversely of its axis, and a manually actuable valve for said discharge means having a control member positioned adjacent said mounting means, said construction adapted for tilting manipulation to discharge variable mixtures of steam and liquid therefrom.*

References Cited in the file of this patent or the original patent

UNITED STATES PATENTS

| | | |
|---|---|---|
| 1,378,266 | Nagel | May 17, 1921 |
| 1,625,034 | Lawner et al. | Apr. 19, 1927 |
| 1,707,453 | Winograd | Apr. 2, 1929 |
| 2,010,331 | Starrick | Aug. 6, 1935 |
| 2,117,419 | Hamrick et al. | May 17, 1938 |
| 2,148,986 | Hoyt | Feb. 28, 1939 |
| 2,289,204 | Milton | July 7, 1942 |
| 2,401,504 | Paasche | June 4, 1946 |
| 2,423,488 | Dowe | July 8, 1947 |